United States Patent
Pagano et al.

(10) Patent No.: US 6,426,695 B2
(45) Date of Patent: Jul. 30, 2002

(54) VOLUME CONTROL FOR AN AUTOMOBILE TURN SIGNAL

(75) Inventors: JoAnne Pagano, 20228 Island Estate Dr., Grosse Ile, MI (US) 48138; Jeffrey T. Helvey, Arlington, VA (US); Robert Sokohl, Derwood; Albert J. Fasulo, Ellicott City, both of MD (US)

(73) Assignee: JoAnne Pagano, Grosse Ile, MI (US)

( * ) Notice: Subject to any disclaimer, the term of this patent is extended or adjusted under 35 U.S.C. 154(b) by 0 days.

(21) Appl. No.: 09/809,283

(22) Filed: Mar. 16, 2001

Related U.S. Application Data

(60) Provisional application No. 60/190,008, filed on Mar. 17, 2000.

(51) Int. Cl.[7] .................................................. B60Q 1/34
(52) U.S. Cl. .................... 340/475; 340/465; 340/384.7; 340/392.3; 340/825.25
(58) Field of Search ................................. 340/475, 465, 340/384.7, 392.3, 825.25

(56) References Cited

U.S. PATENT DOCUMENTS

| | | | |
|---|---|---|---|
| 4,219,706 A | 8/1980 | Koch et al. ..................... 200/4 |
| 5,099,222 A | 3/1992 | Campagna ................... 340/475 |
| 5,192,930 A | 3/1993 | Brueggemann et al. ...... 340/477 |
| 5,414,407 A | 5/1995 | Gerrans et al. ............. 340/475 |
| 5,455,558 A | 10/1995 | Gregory ..................... 340/474 |
| 5,523,738 A | * 6/1996 | Fuller ........................ 340/475 |
| 5,646,590 A | 7/1997 | Dembicks ................... 340/475 |
| 5,699,057 A | 12/1997 | Ikeda et al. ................. 340/937 |
| 5,790,017 A | 8/1998 | Berryhill .................... 340/475 |
| 5,801,622 A | 9/1998 | Chunick ..................... 340/457 |
| 5,808,545 A | 9/1998 | Brueggemann et al. ..... 340/468 |
| 5,828,021 A | 10/1998 | Uchiyama et al. ....... 200/61.54 |
| 5,859,396 A | 1/1999 | Yokoyama ............... 200/61.54 |
| 5,872,510 A | 2/1999 | O'Shaughnessy ........... 340/468 |
| 5,872,511 A | 2/1999 | Ohkuma ..................... 340/471 |
| 5,877,676 A | * 3/1999 | Shankarappa ............... 340/457 |
| 5,918,180 A | 6/1999 | Dimino ...................... 455/456 |

* cited by examiner

*Primary Examiner*—Daniel J. Wu
(74) *Attorney, Agent, or Firm*—Sterne, Kessler, Goldstein & Fox P.L.L.C.

(57) ABSTRACT

The present invention is directed at a volume control for an automobile turn signal indicator. The volume control allows the driver to raise or lower the volume of the clicking sound that is produced when a turn signal indicator is activated. As such, the driver is able to increase the volume of the audible clicking sound when operating in a environment having a high background noise (i.e. a radio or traffic) or when the driver is hearing impaired.

23 Claims, 6 Drawing Sheets

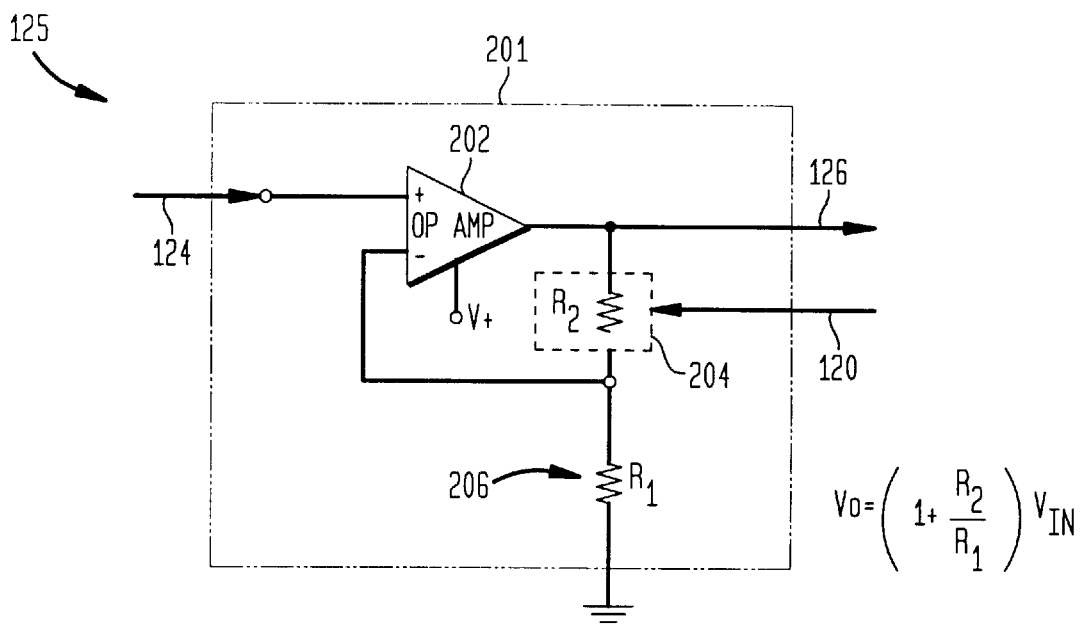
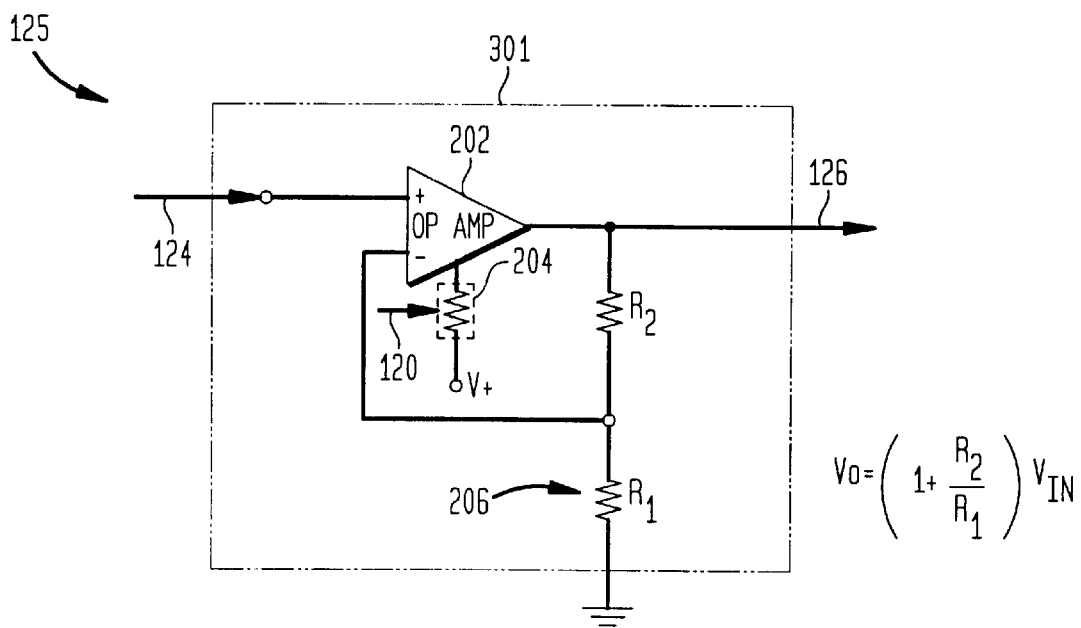

VOLUME CONTROL FOR AN AUTOMOBILE TURN SIGNAL

CROSS-REFERENCE TO RELATED APPLICATIONS

This application claims the benefit of U.S. Provisional Application No. 60/190,008, filed on Mar. 17, 2000, which is incorporated herein by reference in its entirety.

BACKGROUND OF THE INVENTION

1. Field of the Invention

The present invention is generally related to automobile control systems, and applications of the same. More specifically, the invention is related to a volume control for an automobile turn signal indicator.

2. Background Art

Automobile turn signal indicators utilize flashing lamps on the outside of the automobile to warn surrounding traffic of a prospective change in direction. To indicate a turn, the driver moves a lever that is mounted on the steering wheel, which activates the respective turn signal indicator and causes the corresponding exterior lamps to blink on-and-off. Conventional turn signal indicators also include lamps on the dash board that blink on-and-off in synchronization with the blinking of the exterior lamps. Additionally, an audible "clicking" sound is often produced that is also synchronized with the blinking of the exterior lamps. The dash board lamps and audible clicking sound are meant to inform the driver that a particular turn signal indicator is activated. When the driver makes a sufficiently wide turn, a mechanical control device automatically deactivates the turn signal indicator, and stops the blinking lamps and the audible clicking sound.

A problem with conventional turn signal indicators is that occasionally the driver will activate the turn signal, and then not complete the turn for some reason. Alternatively, the driver may execute a turn that is not wide enough to automatically deactivate the indicator, as often occurs when changing lanes during highway driving. When this occurs, the driver must manually deactivate the turn signal indicator in order to stop it. If the turn signal indicator is not manually deactivated, then the driver travels down the road with a blinking turn signal, when no turning maneuver is immediately planned.

As mentioned above, the dash board lamps and the audible clicking sound are supposed to notify the driver when a turn signal indicator is activated. The dash board lamps can be ineffective because the driver's visual attention is often focused on the road ahead, especially during highway driving. The audible clicking sound is difficult to hear for those drivers that are hearing impaired. Additionally, the audible clicking sound can be drowned-out by traffic noise or the radio, even for those drivers with good hearing.

Therefore, what is needed is a way to improve the effectiveness of the turn signal indicator so that drivers, including hearing impaired drivers, will realize when a turn signal indicator is activated.

BRIEF SUMMARY OF THE INVENTION

The present invention is directed at a volume control for an automobile turn signal indicator. The volume control allows the driver to raise or lower the volume of the clicking sound that is produced when a turn signal indicator is activated. As such, the driver is able to increase the volume of the audible clicking sound when operating in a environment having high background noise (i.e. a radio or traffic), or when the driver is hearing impaired.

In embodiments, a thermally sensitive switch connects/disconnects a power supply voltage to the indicator lamps when the driver activates a turn signal lever. The thermally sensitive switch generates an audible clicking sound that is the result the switch action. A microphone receives the clicking sound and generates a corresponding electrical signal. A variable gain amplifier amplifies or attenuates the amplitude of the electrical signal according to the desired volume that is determined by the user/driver. Finally, a speaker converts the electrical signal back into an audible clicking sound that is re-broadcast into the driver compartment.

An advantage of the invention is that the driver is able to raise or lower the volume of the clicking sound, by increasing or decreasing the gain of the variable gain amplifier. Therefore, hearing impaired drivers can increase the volume of the clicking sound as necessary, and decrease the likelihood that they will drive around with an unintended blinking turn signal.

In an alternate embodiments, two or more thermally sensitive switches are configured so that the switches produce clicking sounds of varying sound volume. The driver then selects a switch based the desired volume. For example, low, medium, or high selections could be provided.

BRIEF DESCRIPTION OF THE DRAWINGS/FIGURES

The present invention will be described with reference to the accompanying drawings, which are briefly described as follows.

FIGS. 2–3 illustrate variable gain amplifiers according to embodiments of the present invention.

Figure 6:
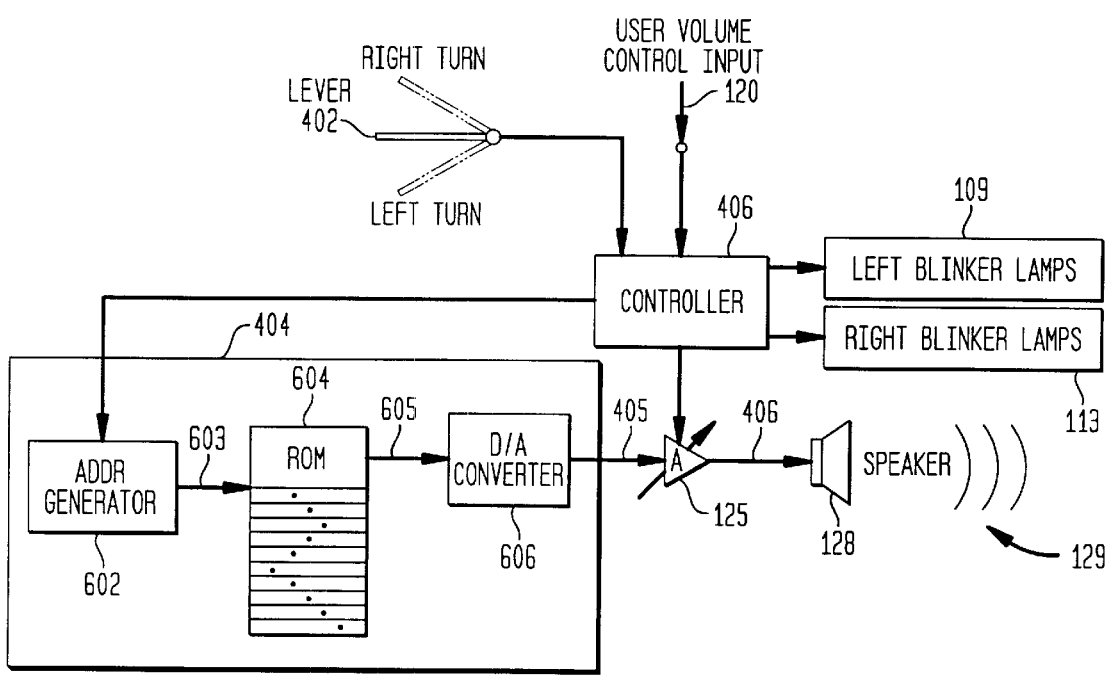

FIG. 6 further illustrates the audio generator 404 in the turn signal indicator 400 according to embodiments of the present invention.

Figure 7:
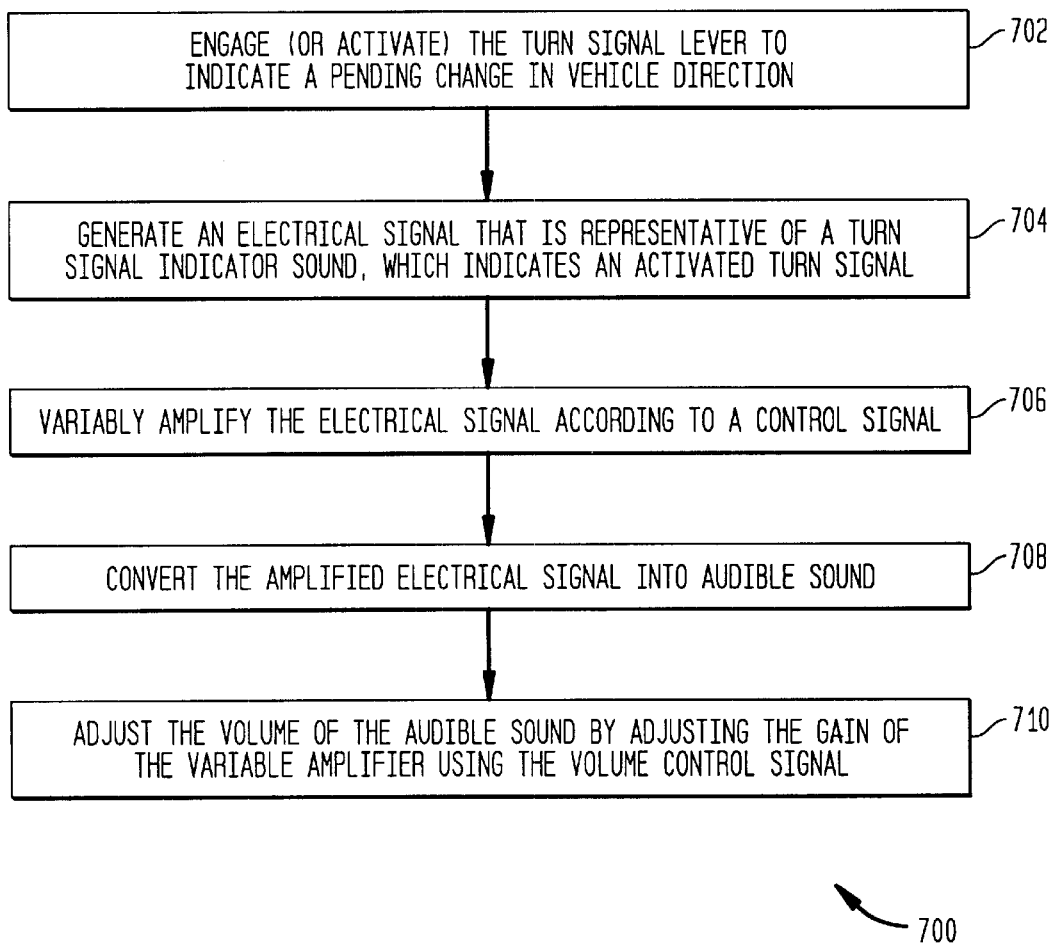

FIG. 7 illustrates a flowchart 700 that further describes the operation of a volume control for a turn signal indicator.

DETAILED DESCRIPTION OF THE INVENTION

Figure 1:
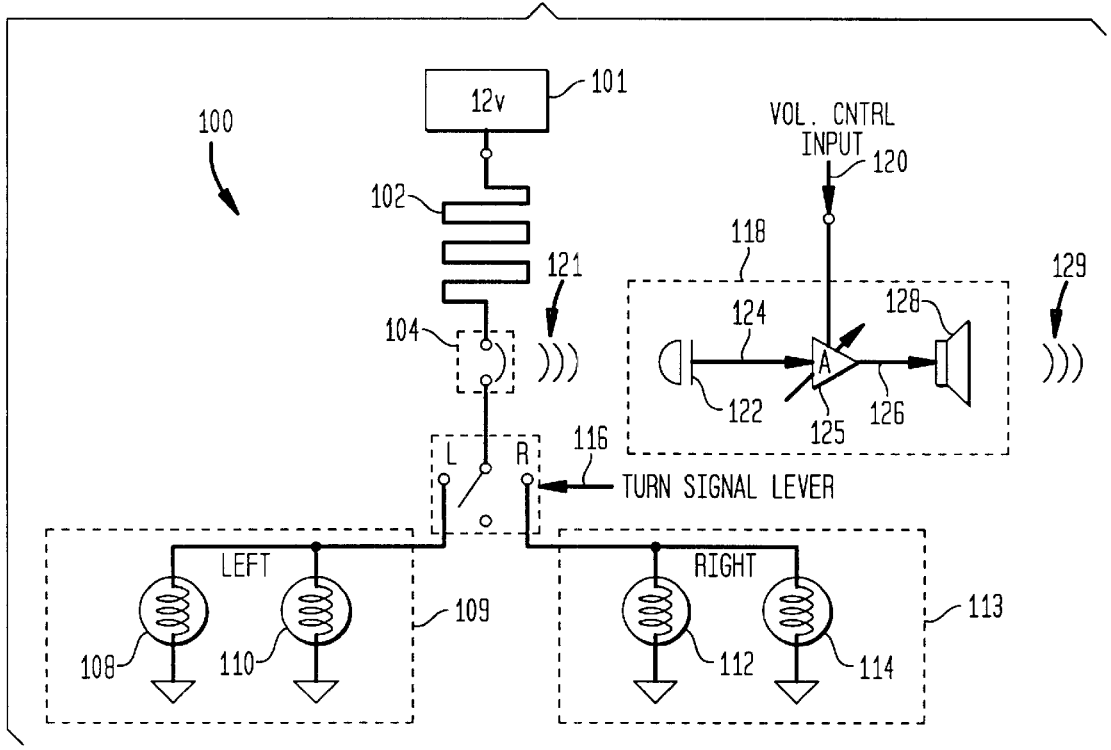
FIG. 1 illustrates a turn signal indicator 100 with volume control according to embodiments of the present invention.

FIG. 1 illustrates a turn signal indicator 100 according to a first embodiment of the invention. Turn signal indicator 100 includes: a 12 volt battery 101, a heater circuit 102, a thermally sensitive switch 104, a turn signal switch 106, a turn signal lever 116, left indicator lamps 109, right indicator lamps 113, and a volume control circuit 118. The left indicator lamps 109 include a left exterior lamp 108 and a left dash board lamp 110. The right indicator lamps 113 include a right dash board lamp 112 and a right exterior lamp 114. The volume control circuit 118 includes a microphone 122, a variable gain amplifier 125, and a speaker 128. The turn signal indicator 100 operates as follows.

The turn signal switch 106 is a 3-pole switch that is controlled by the turn signal lever 116 that is located on the steering column. When the driver moves the turn signal lever 116 to the down position in preparation for a left hand turn, the selector switch 106 connects the 12 battery 101 to the left indicator lamps 109. When the driver moves the turn signal lever 116 to the up position in preparation for a right hand turn, the selector switch 106 connects the 12 battery to the right indicator lamp 113.

The heater circuit 102 and the thermally sensitive switch 104 are connected in series between the indicator lamps 109, 113 and the battery 101. The heater circuit 102 includes a low resistive winding that heats up when current flows through it. The thermally sensitive switch 104 is normally closed, but opens when the temperature is raised.

In embodiments, the thermally sensitive switch 104 is a bi-metallic thermal switch that has one or more bimetallic strips that flex open and closed based on the temperature.

Once either of the indicator lamps 109 or 113 are coupled to the battery 101, electrical current begins to the flow to the indicator lamps through the heater circuit 102 and the thermal switch 104, causing the lamps to light. After one or two seconds, the heater circuit 102 raises the temperature by a sufficient amount to cause the thermally sensitive switch 104 to flex open and stop the current flow. After being open for 1 or 2 seconds, the thermally sensitive switch 104 cools sufficiently, and flexes closed. As such, the thermally sensitive switch 104 repeatedly opens and closes, and causes the selected indicator lamps to blink on-and-off until the selector switch 106 is returned to the neutral position. Additionally, a "clicking" sound 121 is produced by the thermally sensitive switch each time the bimetallic strips flex open and closed. Volume control circuit 118 picks up the clicking sound and controls the volume as described below.

Referring now to volume control circuit 118, the microphone 122 picks up the clicking sound 121, and converts the clicking sound into an electrical signal 124. The amplifier 125 amplifies the electrical signal 124 according to the volume control input 120, resulting in an electrical signal 126. The volume control input 120 controls the gain of the amplifier 125, and therefore the amplitude of the electrical signal 126. The speaker 128 converts the electrical signal 126 back into an audible clicking sound 129 that is re-broadcast back into the driver compartment of the automobile. The speaker 129 can be the same speaker that is used for the car radio.

An advantage of the invention is that the driver is able to raise or lower the volume of the clicking sound 129, by increasing or decreasing the gain of the amplifier 125. Therefore, hearing impaired drivers can increase the volume of the clicking sound as necessary, and decrease the likelihood that they will drive around with an unintended blinking turn signal.

FIG. 2 illustrates a variable gain amplifier 201 that is one embodiment for the variable gain amplifier 125. Variable gain amplifier 201 includes an operational amplifier (op amp) 202, a variable resistor 204, and a resistor 206. Op amp 202 can be any type of op amp suitable for audio amplification.

Variable gain amplifier 201 has a gain that is determined by the equation: $Vo/Vin=(1+R_2/R_1)$; where $R_2$ is the variable resistor 204, and $R_1$ is the resistor 206. The variable resistor 204 (also called a potentiometer) is controlled by the volume control 120 that is set by the driver. As such, the gain of the amplifier 201 (and ultimately the volume of the clicking sound 129) are controlled by the control input 120, using the variable resistor 204.

Operational amplifiers can be configured as attenuators using the appropriate resistor combination as will be understood by those skilled in the arts. Therefore, the variable gain amplifier 125 can provide attenuation if a driver wants a lower volume than that provided by the unprocessed clicking sound 121.

FIG. 3 illustrates variable gain amplifier 301 that is an alternate embodiment for the variable gain amplifier 125. Variable gain amplifier 301 is similar to variable gain amplifier 201, except that $R_1$ and $R_2$ for the op amp are fixed. The variable resistor 204 is used to control the power supply voltage or current for the op amp 202, and thereby controls the amplifier gain.

Figure 4:
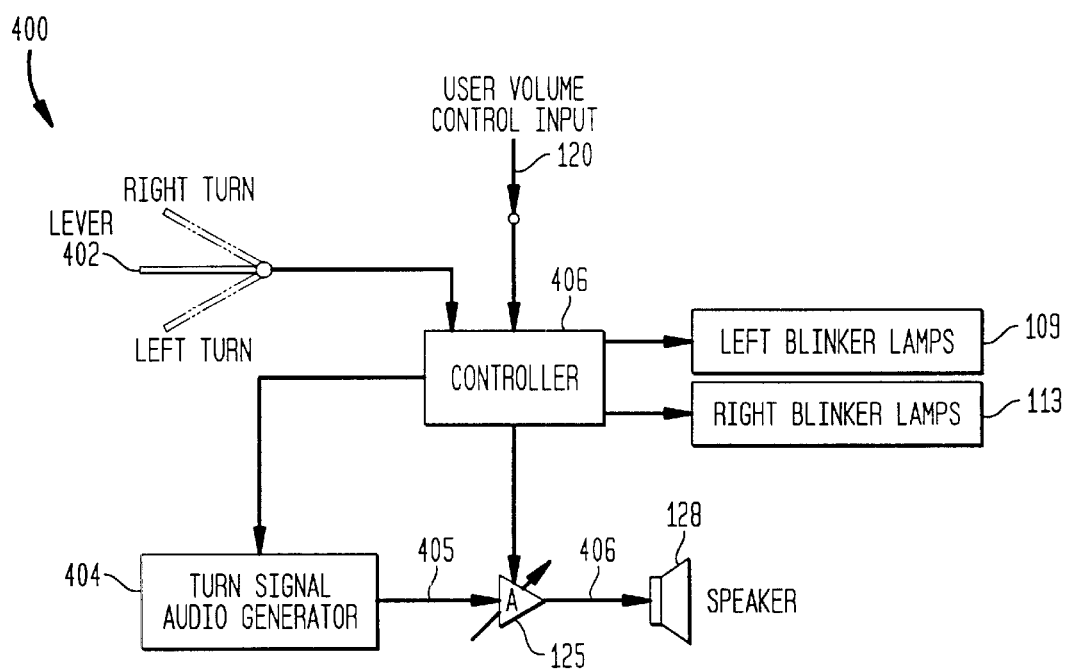
FIG. 4 illustrates a turn signal indicator 400 with volume control according to embodiments of the present invention.

FIG. 4 illustrates a turn signal indicator 400 according to embodiments of the invention. Turn signal indicator 400 includes: a turn signal lever 402, a turn signal audio generator 404, a controller 406, the variable gain amplifier 125, the left indicator lamps 109, and the right indicator lamps 113. The turn signal generator 400 operates as follows.

The controller 406 receives the driver volume control input 120 and appropriately sets the gain of the variable gain amplifier 125. The controller 406 detects when the driver has moved the lever 402 to indicate a left turn or a right turn. Once the lever 402 has been activated, the controller 406 activates the turn signal audio generator 404. Audio generator 404 generates an audio signal 405 that simulates the clicking sound 121 that is produced by the thermally sensitive switch 104 in FIG. 1. The variable gain amplifier 125 amplifies the audio signal 405 according to the control signal 120, resulting in audio signal 406. Speaker 128 receives the audio signal 406 and broadcasts it into the driver compartment.

As with turn signal indicator 100, indicator 400 permits the driver to raise or lower the volume of the clicking sound by using the control input 120.

In FIG. 6, the turn signal audio generator 404 includes an address generator 602, a read only memory (ROM) 604, and a digital-to-analog converter (DAC) 606. The ROM 604 stores a digital representation of the clicking sound 121 that is produced by the thermally sensitive switch 104. The address generator 602 generates addresses 603 of the ROM 604, so as to read-out a digital signal 605 that carries the digital representation of the clicking sound 121, when the turn signal lever 402 is engaged. The DAC 606 converts the digital signal 605 to analog to generate the audio signal 405, which is variably amplified by the amplifier 125 based on the volume control signal 120.

As stated, the ROM 604 stores a digital representation of the clicking sound 121 that is produced by the thermally sensitive switch 104. The digital representation can be an approximation of the clicking sound 121. Alternatively, the ROM 604 can store a digital representation of another type of sound to indicate that the turn signal indicator is activated including: alarms, beeps, buzzes, and taped messages in any one of numerous languages.

Figure 5:
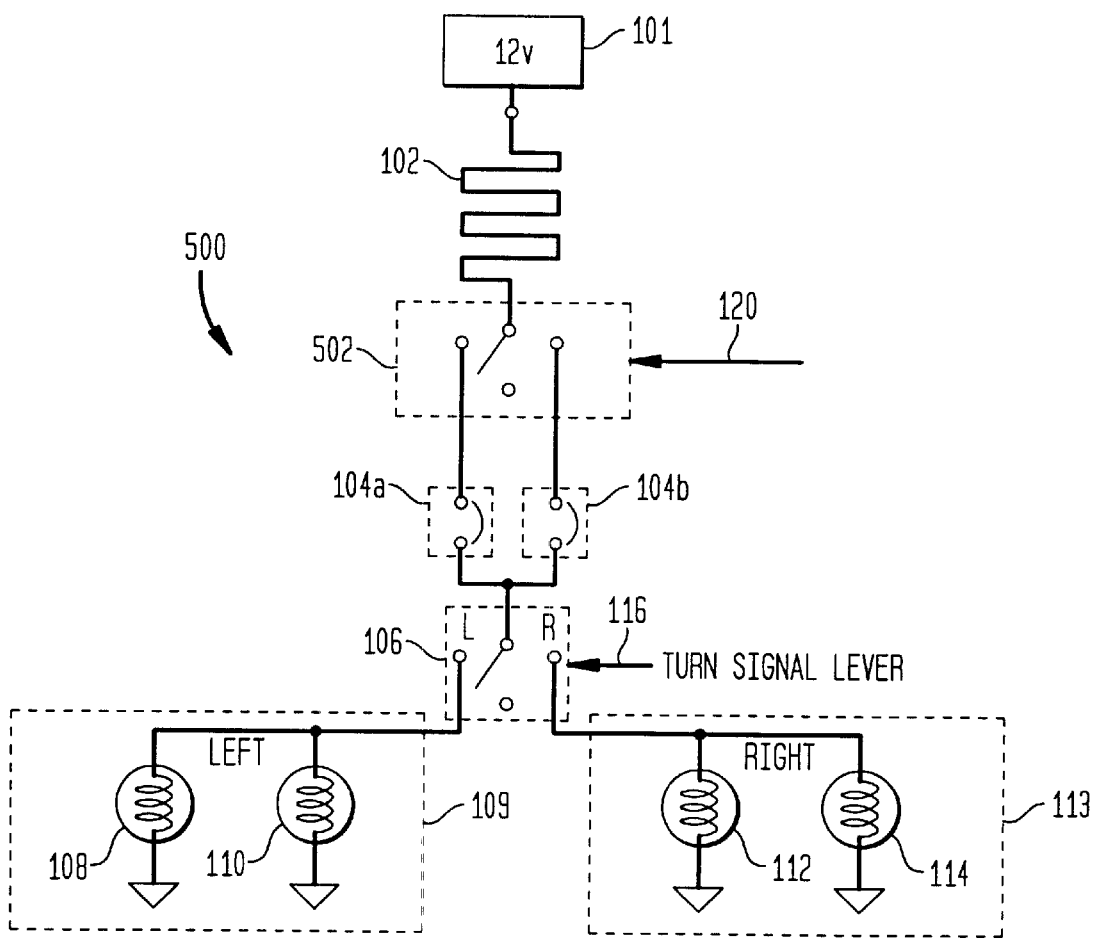
FIG. 5 illustrates a turn signal indicator 500 with volume control according to embodiments of the present invention.

FIG. 5 illustrates a turn signal indicator 500 according to embodiments of the present invention. Turn signal indicator 500 is similar to turn signal indicator 100 except that the volume control circuit 118 is replaced with a selection switch 502 and two thermally sensitive switches 104a and 104b. Thermally sensitive switches 104a and 104b operate similar to that described above, except that one switch 104a is configured to admit a louder clicking sound when being switched than the switch 104b. As such, switch 104a can be described as a high volume switch, and switch 104b can be described as a low volume switch. The volume control signal 120 controls the selection switch 502, and therefore enables the driver to select either the high volume clicking sound from the switch 104a or the low volume clicking sound from the switch 104b. The invention is not limited to two switch selections, as any number of thermally sensitive switches corresponding to different volumes could be provided. For example, low, medium, and high selections could be provided using three switches 104.

FIG. 7 illustrates a flowchart 700 that further describes the operation of a volume control for a turn signal indicator.

In step 702, a user engages (or activates) the turn signal lever to indicate a pending change in direction.

In step 704, an electrical signal is generated that is representative of a sound that is associated with a turn signal indicator. For example, in FIG. 1, the microphone 122 generates an electrical signal 124 from a clicking sound 121 that is generated by the thermally sensitive switch 104. Alternatively, the turn signal generator 404 generates an audio signal 405. More specifically, the ROM 604 reads-out a digital signal 605 that carries a digital representation of the clicking sound 121, which is then converted to analog by the DAC 606 to produce the audio signal 405.

In step 706, the electrical signal is variably amplified according to a control signal 120. For example, the variable amplifier 125 amplifies the electrical signal 124 (or the audio signal 405) according to the volume control signal 120. In other words, the volume control signal 120 determines the gain of the amplifier 125 and therefore the amplitude of the amplified electrical signal.

In step 708, the amplified electrical signal is converted to audible sound. For example, the speaker 128 converts the amplified electrical signal into audible sound 129.

In step 710, the volume of the audible sound 129 is increased or decreased by adjusting the volume control signal 120. The volume control signal 120 adjusts the gain of the amplifier 125.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A method of volume control for a turn signal indicator, comprising the steps of:
   receiving an electrical signal representative of a turn signal indicator sound; and
   variably amplifying said electrical signal according to a volume control signal, wherein said volume control signal represents a desired volume for said turn signal indicator sound;
   wherein said turn signal indicator sound approximates a clicking sound that is generated by a thermally sensitive switch.

2. The method of claim 1, further comprising the step of:
   converting said amplified electrical signal into audible sound.

3. The method of claim 1, further comprising the step of:
   driving a speaker with said amplified electrical signal.

4. The method of claim 1, further comprising the step of:
   adjusting said volume control signal, thereby adjusting amplification of said electrical signal, and thereby adjusting said volume of said turn signal indicator sound.

5. The method of claim 1, further comprising the step of:
   generating said electrical signal based on activation of a turn signal lever.

6. The method of claim 5, wherein said generating step comprises the steps of:
   operating a switch based on said activation of said turn signal lever, wherein said switch produces said clicking sound during said operating step; and
   converting said clicking sound into said electrical signal.

7. The method of claim 5, wherein said generating step includes the steps of:
   generating a digital signal representative of said turn signal indicator sound; and
   converting said digital signal into analog to produce said electrical signal.

8. The method of claim 7, wherein said step of generating said digital signal comprises the step of retrieving said digital signal from a memory device.

9. The method of claim 8, wherein said memory device stores a digital representation of said turn signal indicator sound.

10. A method of volume control for a turn signal indicator, comprising the steps of:
    generating a digital signal that is representative of a clicking sound that is generated by a thermally sensitive switch and associated with the turn signal indicator;
    generating a digital signal that is representative of a clicking sound associated with the turn signal indicator;
    converting said digital signal into an analog signal;
    variably amplifying said analog signal according to a volume control signal, wherein said volume control signal represents a desired volume for said turn signal indicator sound; and
    converting said amplified analog signal into audible sound.

11. The method of claim 10, wherein said step of generating a digital signal includes the step of reading said digital signal from a memory device, wherein said memory device stores a digital representation of said clicking sound.

12. The method of claim 10, wherein said step of converting includes the step of driving a speaker with said amplified analog signal.

13. A turn signal indicator, comprising:
    a means for generating an electrical signal that is representative of a turn signal indicator sound, wherein said turn signal indicator sound approximates a clicking sound produced by a thermally sensitive switch; and
    a variable gain amplifier that amplifies said electrical signal according to a volume control signal, wherein said volume control signal represents a desired volume for said turn signal indicator sound.

14. The turn signal indicator of claim 13, wherein said variable gain amplifier comprises an operational amplifier having a variable resistor that determines a gain of said variable gain amplifier, wherein a resistance of said variable resistor is determined by said volume control signal, and thereby said gain of said variable gain amplifier is determined by said volume control signal.

15. The turn signal indicator of claim 13, further comprising a speaker coupled to an output of said variable gain amplifier.

16. The turn signal indicator of claim 13, wherein said means for generating comprises:
- a memory device that stores a digital representation of said turn signal indicator sound; and
- a digital-to-analog converter that is coupled to an output of said memory device.

17. A turn signal indicator, comprising:
- a means for generating an electrical signal that is representative of a turn signal indicator sound; and
- a variable gain amplifier that amplifies said electrical signal according to a volume control signal, wherein said volume control signal represents a desired volume for said turn signal indicator sound;
- wherein said means for generating comprises,
  - a thermally sensitive switch that generates a clicking sound when said thermally sensitive switch is connected to a voltage supply; and
  - a microphone that generates said electrical signal based on said clicking sound.

18. A turn signal indicator, comprising:
- a first means for producing a first clicking sound and a second means for producing a second clicking sound, wherein said first clicking sound is louder than said second clicking sound; and
- a means for selecting between said first means for producing and said second means for producing, wherein said means for selecting is responsive to a volume control signal.

19. The turn signal indicator of claim 18, further comprising a third means for producing a third clicking sound that has a volume that is quieter than said first clicking sound but is louder than said second clicking sound, and wherein said third means for producing is selectable from said means for selecting.

20. The turn signal indicator of claim 18, wherein said first means for producing comprises a first thermally sensitive switch and said second means for producing comprises a second thermally sensitive switch, wherein said first thermally sensitive switch and said second thermally sensitive switch are configured so said first clicking sound is louder than said second clicking sound.

21. The turn signal indicator of claim 20, wherein said first thermally sensitive switch and said second thermally sensitive switch are selectable by said means for selecting.

22. A turn signal indicator, comprising:
- a first thermally sensitive switch capable of generating a first clicking sound when said thermally sensitive switch is connected to a voltage supply;
- a second thermally sensitive switch capable of generating a second clicking sound when said second thermally sensitive switch is connected to said voltage supply; and
- a selection switch having an input coupled to said voltage supply and capable of connecting said voltage supply to one of said first thermally sensitive switch and said second thermally sensitive switch, wherein said selection switch is controlled by a volume control signal.

23. The turn signal indicator of claim 22, wherein said volume control signal determines which of said first thermally sensitive switch and said second thermally sensitive switch is connected to said voltage supply.

* * * * *